United States Patent [19]

Wolf et al.

[11] Patent Number: 4,652,498

[45] Date of Patent: Mar. 24, 1987

[54] ENVIRONMENTALLY PROTECTED OPTICAL RECORDING MEDIA

[75] Inventors: Stephen F. Wolf; Ramon F. Hegel, both of St. Paul, Minn.

[73] Assignee: Minnesota Mining and Manufacturing Company, St. Paul, Minn.

[21] Appl. No.: 790,097

[22] Filed: Oct. 22, 1985

[51] Int. Cl.$^4$ ............................................. G11B 3/70
[52] U.S. Cl. ..................... 428/461; 428/65; 430/271; 346/135.1; 369/284; 369/286; 369/288
[58] Field of Search ............ 428/64, 65, 461; 430/271; 369/286, 288, 284; 346/135.1

[56] References Cited

U.S. PATENT DOCUMENTS

| | | | |
|---|---|---|---|
| 3,843,399 | 10/1974 | Kaplan et al. | 117/217 |
| 3,984,500 | 10/1976 | Dickie et al. | 260/885 |
| 3,992,477 | 11/1976 | Dickie et al. | 260/827 |
| 4,020,278 | 4/1977 | Carre et al. | 358/128 |
| 4,037,251 | 7/1977 | Bricot et al. | 358/128 |
| 4,124,672 | 11/1978 | Jarsen | 264/129 |
| 4,126,726 | 11/1978 | Soeding | 428/163 |
| 4,296,158 | 10/1981 | Lewis | 428/65 |
| 4,368,043 | 1/1983 | Yamauchi et al. | 433/217 |
| 4,374,077 | 2/1983 | Kerfeld | 264/22 |
| 4,420,537 | 10/1983 | Hayama et al. | 428/403 |
| 4,430,363 | 2/1984 | Daniels et al. | 427/54.1 |
| 4,526,837 | 7/1985 | Ohtsuki et al. | 428/425.9 |
| 4,537,940 | 8/1985 | Omura et al. | 526/278 |
| 4,539,382 | 9/1985 | Omura et al. | 526/276 |
| 4,540,722 | 9/1985 | Bunker | 523/109 |

FOREIGN PATENT DOCUMENTS 57-150151 9/1982 Japan.
58-121150 7/1983 Japan.
58-137149 8/1983 Japan.

Primary Examiner—Alexander S. Thomas
Attorney, Agent, or Firm—Donald M. Sell; James A. Smith; Douglas B. Little

[57] ABSTRACT

An optical recording medium comprising a transparent substrate having an information-bearing surface, a specularly reflective layer on the information-bearing surface, and a protective layer covering the other side of the reflective layer has been improved by using a new type of protective layer which comprises a polymeric network containing phosphoric acid moieties. Examples of the compounds which are cured into the protective layer in order to obtain better adhesion to aluminum protective layers are: 2-methacryloyloxyethyl phosphate, and the phosphonate ester triacrylate having the formula

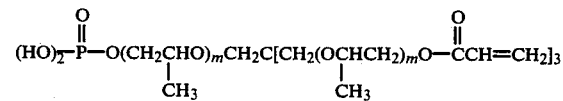

wherein m may be 1-5. These phosphorous-containing organic compounds are radiation curable, and they are mixed with other radiation curable polymers to form the protective layer which is preferably radiation cured. Phosphorous atoms account for between about 0.05 and 0.5 weight-percent of the polymeric network within the protective layer. The improved protective layer has been found to avoid corrosion and provide better adhesion than previously known protective layers for optical recording disks such as compact audio disks and video disks.

6 Claims, 1 Drawing Figure

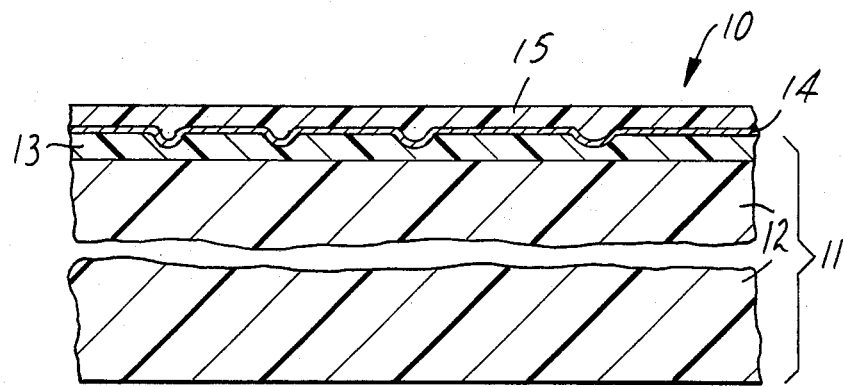

ENVIRONMENTALLY PROTECTED OPTICAL RECORDING MEDIA

A standard optical recording medium such as used in compact audio disks, video disks, or CD-ROM disks comprises a transparent substrate having a patterned information-bearing surface, a specularly reflective aluminum-based layer coated onto the information-bearing surface, and a protective layer. Protection is vital for the very thin, aluminum-based specularly reflective layer (typically a few hundred angstroms of vapor-deposited or sputtered material), since damage to this layer can inhibit reproduction of information from the medium. When the medium is being read, a sensing beam such as a laser beam is directed through the transparent substrate to the information-bearing surface covered with the aluminum-based specularly reflective layer. Under normal operation, the laser beam is reflected in a patterned manner at the information-bearing surface back through the transparent substrate to a sensing device which translates the reflected beam to electric signals.

Damage to the aluminum-based reflective layer can occur through corrosion, which typically produces a transparent aluminum oxide, and through scratching or scuffing, which removes part of the layer. In areas where the reflective layer has been made transparent or removed, signals are lost or reduced, whereupon there is a loss or distortion of recorded information.

In one typical commercial product, the protective layer comprises a polymeric film which apparently is coated onto the transparent substrate, covering both the aluminum-based reflective layer and also adjacent portions of the substrate which were masked to shield them from application of the aluminum-based layer. Such shielding is necessary to anchor the protective film to the disk; the protective film adheres well to the areas of the substrate not coated with the aluminum-based layer, but has little adhesion to the aluminum-based layer.

There are several disadvantages to this existing commercial practice. Shielding of the transparent substrate during coating of the specularly reflective aluminum-based layer is expensive and inconvenient. Further, the lack of adhesion of the film to the aluminum-based layer reduces protection. If there is a scratch in the film, e.g., through wear and tear on the disk, part of the film may peel away. Also, moisture may penetrate between the aluminum-based layer and poorly adhered film in the area of the scratch and accelerate corrosion.

SUMMARY OF THE INVENTION

The present invention provides an optical recording medium of enhanced protection for the specularly reflective aluminum-based layer. This medium generally comprises the basic structure described above of a transparent substrate having a patterned information-bearing surface, a specularly reflective aluminum-based layer coated onto the information-bearing surface, and a polymeric protective layer disposed over the specularly reflective layer. However, according to this invention, the protective layer is strongly adhered to the specularly reflective layer, whereby improved resistance to deterioration or degradation of the specularly reflective layer is achieved. The protective layer comprises a polymeric network formed by reacting ethylenically unsaturated components, and carries phosphoric acid groups disposed at spaced locations on the network.

Although phosphoric acid itself can corrode an aluminum-based layer, use of phosphoric acid groups in limited amounts in spaced locations has been found to avoid corrosion, apparently because there is an insufficient concentration of acid at any single location. For best results, the phosphoric acid groups are included in an amount such that phosphorous atoms account for between about 0.05 and 0.5 weight-percent of the polymeric network.

DESCRIPTION OF PREFERRED EMBODIMENTS

The drawing shows a greatly enlarged cross-section through a small portion of an illustrative optical recording medium 10 of the invention. In the illustrative recording medium, there is a transparent substrate 11 which comprises a transparent base sheet 12 (shown in broken form since it is relatively much thicker than the other layers in the product) and a patterned information-bearing layer 13 coated on the base sheet. A specularly reflective layer 14 is coated over the information-bearing surface and a protective layer 15 is disposed over the specularly reflective layer.

The composition of the base sheet 12, information-bearing layer 13, and specularly reflective layer 14 can be of a type known in the art, and the procedures for forming such layers are known in the art. See, for example, U.S. Pat. Nos. 4,124,672; 4,296,158; 4,374,077; and 4,430,363.

For recording media of the invention, a preferred base sheet comprises polymethylmethacrylate or polycarbonate. The information-bearing layer preferably comprises a radiation-curable material based on ethylenically unsaturated monomers or polymers. The specularly reflective layer is based on aluminum (i.e., includes at least a major proportion of aluminum), but can include other metals such as chromium.

The protective layer comprises a polymeric network formed from ethylenically unsaturated ingredients (e.g., acrylic, methacrylic, vinyl and allyl functional materials, particularly polyacryloyl and polymethacryloyl materials). Typically, the ethylenically unsaturated ingredients are monomeric in form, though polymeric unsaturated ingredients are also useful. Polymeric species that are saturated and not reactive with other ingredients of the layer may also be included. For example, a polymeric molecule such as polymethylmethacrylate is desirable to thicken the coating material and make it easier to apply. The ingredients are desirably free from reactive functionalities other than the ethylenic unsaturated and the previously noted phosphoric acid functionality but, cure initiators, such as photo initiators may be included in a known manner.

A compound that provides phosphoric acid functionality is also included. Preferred ingredients, which achieve good adhesion while also maintaining long life in corrosion tests, have the following formulation.

Formulation A

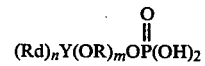

wherein,

Rd is 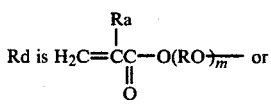 or (I)

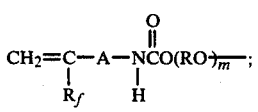 (II)

n is 1-3, and those bond sites on Y not occupied by Rd are occupied by —H or —ReOH wherein Re is a straight chain or branched alkyl (1-30C);
Ra is —H or —$CH_3$;
—Y— is a straight chain, cyclic or branched aliphatic, aromatic or alicyclic hydrocarbon moiety of 1-30C;
R is an alkylene moiety having 2 to 5 carbon atoms;
$R_f$ is hydrogen or methyl;
A is selected from

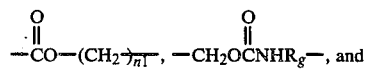

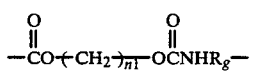

in which n1 is from 1 to 6 and $R_g$ is a divalent radical selected from alkylene (2-10 carbon atoms), 5 or 6 membered carbocyclic aliphatic radicals having 5 to 10 carbon atoms and arylene radicals having 6 to 10 carbon atoms; and
m=1-10, preferably 1-5.

The acrylates of the above formula may be made from commercially available propoxylated, partially acrylated polyols without solvent at temperatures up to about 90° to 95° C. using polyphosphoric acid. An examplary reaction is as follows.

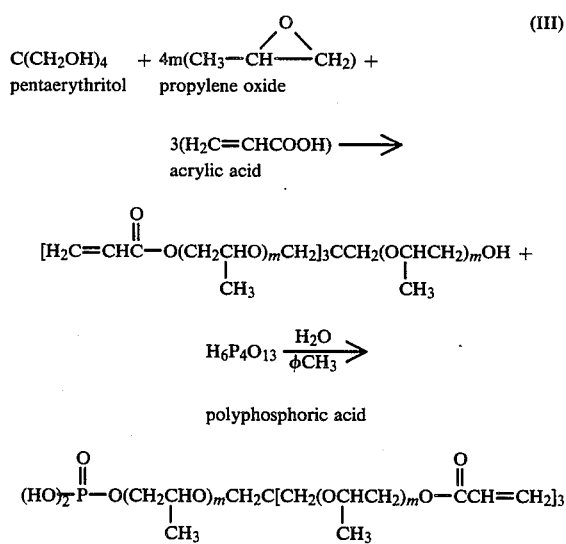

Phosphonate Ester Triacrylate (IV)

The procedure of the last step is exemplified in the following specific example, which uses as ingredients:

| | |
|---|---|
| Propoxylated partially acrylated polyol (obtained as Photomer 4171 from Diamond Shamrock Chemical Company) | 7.000 Kg |
| Phenolic antioxidant (obtained as Irganox 1010 from Ciba-Geigy Corp.) | 8.1 g |
| Polyphosphoric acid (ppa) | 1.785 Kg |

The ppa was poured from a beaker into a clean, dry 12.4 liter round bottom flask containing the propoxylated partially acrylated polyol and the antioxidant over a 70 minute period during which the batch temperature was controlled at about 70°-90° C. After the polyphosphoric acid had been completely added, the reaction flask was heated to 95° C. and maintained at that temperature for 3 hours. The reaction was continued at 93° C. and maintained at that temperature for 3-4 hours.

The batch was then cooled to about 80° C., and 1.5 liters of deionized water and about 3 liters of toluene were added. The batch was mixed for one hour and was allowed to settle. The water phase was decanted off, and a second water wash was performed, after which the water phase was again decanted off.

At this point, the batch was heated (80°-112° C.) with dry air flow through the flask, and the remaining water was removed by distillation of the water/toluene azeotrope. The batch was cooled down to near room temperature. The finished batch was clear and was analyzed as the phosphorate ester acrylate of Formula IV.

It is preferred that the phosphorate ester triacrylate product have a maximum acrylic functionality. Also preferred is a molecular weight in the range of about 800-1200 obtained by adjusting the amount of propylene oxide used to make the propoxylated partially acrylated polyol which in turn adjusts the chain length of the polyether portion of the molecule.

Another embodiment of the inventive phosphorate ester compounds is the subclass of alkoxylated urethane phosphorate esters represented by the generic formula when the moiety Rd is the group designated II above.

This subclass may be made using as a raw material unsaturated organic compounds having the following formula:

 (IV)

Exemplary compounds of formula (IV) are: isocyanato-alkyl acrylates and methacrylates such as isocyanatomethyl acrylate, 2-isocyanatoethyl acrylate, 2-isocyanatoethyl methacrylate, 3-isocyanatopropyl acrylate, 3-isocyanatopropyl methacrylate, 6-isocyanatohexyl acrylate, olefinic isocyanate esters such as alkyl isocyanate and methallyl isocyanate, and the adducts of one mole of an organic diisocyanate and one mole of an ethylenically unsaturated addition polymerizable compound having a single group reactive with the isocyanate group.

A specific example of such alkoxylated urethane phosphonate esters may be made by the following reaction sequence, in which the reaction product of pentaerythritol and propylene oxide (prepoxylated pentaerythritol) is reacted with isocyanatoethyl-methacrylate, which is further reacted with polyphosphoric acid.

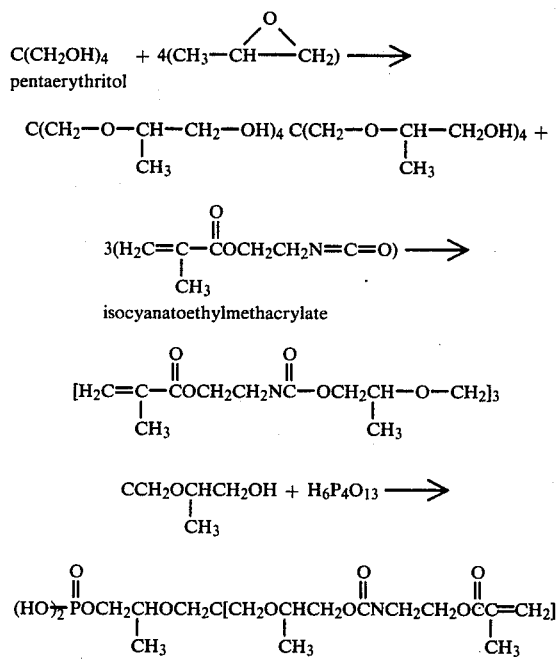

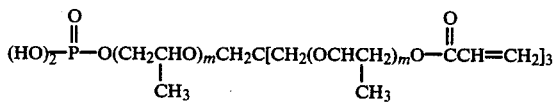

Other polyols may be substituted for pentaerythritol, such as: trimethylol propane, trimethylol ethane, hexane 1,2,6-triol, glycerol, erythritol, dipentaerythritol, sucrose, and sorbitol.

Other epoxides may be used beside propylene oxide, such as: ethylene oxide, butylene oxide, amylene oxide and tetramethylene oxide. Mixtures of more than one expoxide could be used in which case R in Formulation A may be more than one different alkylene moiety, i.e., more than one type of R in the same ester molecule.

Another compound that is useful for providing phosphoric acid functionality is 2-methacryloyloxyethyl phosphate. This ingredient has achieved good adhesion, although not as long life in the corrosion test.

The phosphoric acid functionality is included as only a minor component of the protective layer. Best results have been obtained when phosphorous atoms account for approximately 0.05 to 0.5 weight-percent of the polymeric network of the protective layer. Such an amount of phosphoric acid functionality achieves desired levels of adhesion without unacceptable corrosion. The phosphoric acid groups are spaced over the polymeric network so that there is no concentration of phosphoric acid that would provide a site for corrosion.

The protective layer is desirable transparent, primarily for aesthetic reasons, to show the brightly reflective aluminum-based layer.

Adhesion of the protective layer to the aluminum-based reflective layer can be measured by a Cross-Hatch tape test. In this test, an "X" is cut in the protective layer using a razor blade, with the lines of the "X" approximately perpendicular to one another and approximately one centimeter long. "Scotch" Brand "Magic" Transparent Tape is pressed over the cut "X" and firmly adhered by finger pressure, and then pulled rapidly from the cut area. Preferably, no part of the protective layer is removed during this test.

Resistance to corrosion of a recording medium or disk of the invention is measured by hanging the recording medium or disk in an environmental chamber where the temperature is maintained at 60° C. and 85% relative humidity. After preselected periods in the chamber, typically 100-hour increments, the recording medium is removed and tested both for adhesion by the Cross-Hatch tape test and for possible corrosion. Corrosion can be detected by noting if the error rate for the test medium remains within accepted industry specifications after the environmental test and/or by visual observation, usually under a microscope at 100X magnification.

The invention will be further illustrated by the following examples.

EXAMPLE 1

A solventless radiation-curable formulation was prepared by combining 40 grams of 1,6 hexanedioldiacrylate, 30 grams of 2,2-ethoxyethoxyethyl acrylate, 30 grams of polyethylmethacrylate (Elvacite 2043 supplied by Dupont), 0.1 gram of dimethoxyphenylacetophenone, and 0.2 gram of a phosphoric-acid-containing acrylic oligomer described in Formulation A above, specifically These ingredients were thoroughly mixed on a mechanical shaker and then the mixture was filtered through a one-micron filter cartridge under pressure.

A transparent substrate having a patterned information-bearing surface formed from radiation-cured acrylic-based polymer was separately prepared and an aluminum-chromium layer (97% aluminum, 3% chromium) sputtered over the information-bearing surface to a 700-angstrom thickness.

Using the rolling-bead method of photopolymer replication described in U.S. Pat. No. 4,374,077, the photopolymer formulation described above was applied to the freshly-deposited, specularly reflective layer. A piece of unprimed smooth-surfaced polyester (about 0.17 millimeter thick) was used as the stamper (in the position of the film 4 in FIG. 3 of U.S. Pat. No. 4,374,077). The coating was cured using a 200 watt-/inch, high-intensity, medium-pressure mercury vapor lamp passed over the sample at a rate of 3 centimeters/-second. The polyester stamper was then removed leaving a 7-micrometer-thick coating over the metal surface. The Cross-Hatch tape test described above was performed to confirm adhesion of the film to the metal.

The protective-coated article made above was subjected to 1,000 hours at 60° C. and 85% relative humidity. After this time the article still passed the Cross-Hatch tape test. Microscopic examination of the metal surface showed no defects due to corrosion or chemical deterioration.

EXAMPLE 2

Example 1 was repeated except that the solventless radiation-curable formulation was prepared by combining 40 grams of 1,6-hexanedioldiacrylate, 30 grams of 2,2-ethoxyethoxyethyl acrylate, 30 grams of poly(ethylmethacrylate) (Elvacite 2043), 0.1 gram of dimethoxyphenylacetophenone and 0.2 gram of 2-methacryloyloxyethyl phosphate. The coated recording medium passed the Cross-Hatch adhesion test and survived 300 hours at 60° C. and 85% relative humidity without showing defects due to corrosion or chemical deterioration.

EXAMPLE 3

Example 1 was repeated except that the solventless radiation-curable formulation was prepared by combining 40 grams of 1,6-hexanedioldiacrylate, 30 grams of 2-ethoxyethoxyethyl acrylate, 30 grams of poly(ethylmethacrylate) (Elvacite 2043 supplied by Dupont), 5 grams of N-vinylpyrrolidone, 0.1 gram of dimethoxyphenylacetophenone, and 0.2 gram of the phosphoric-acid containing acrylic oligomer described in Formulation A above, where Rd is (I), n=2, m=1, Y is $CH_3-CH_2-C(CH_2)_3$, and Ra is H. The coated recording medium passed the Cross-Hatch test and survived 300 hours at 60° C. and 85% relative humidity without showing defects due to corrosion or chemical deterioration.

EXAMPLE 4

Example 2 was repeated except that the solventless radiation-curable formulation was prepared by combining 40 grams of 1,6-hexanedioldiacrylate, 30 grams of 2-ethoxyethoxyethyl acrylate, 30 grams of poly(ethylmethacrylate) (Elvacite 2043 supplied by Dupont), 0.1 gram of dimethoxyphenylacetophenone, and 0.2 gram of the phosphoric-acid containing acrylic oligomer described in Formulation A above, where Rd is (II), n=2, m=3.5, —Y— is $CH_3CH_2C(CH_2)_3$, and Ra is —CH₃. The coated recording medium passed the Cross-Hatch test and survived 300 hours at 60° C. and 85% relative humidity without showing defects due to corrosion or chemical deterioration.

We claim:

1. An optical recording medium comprising a transparent substrate having a patterned information-bearing surface, a specularly reflective aluminum-based layer coated onto the patterned surface such that a sensing beam may be directed through the transparent substrate and be reflected by the specularly reflective layer to a sensing device, and a protective layer disposed over and adhered to the specularly reflective layer, the protective layer comprising a polymer formed from ethylenically unsaturated constituents and from a phosphorate compound having the formula

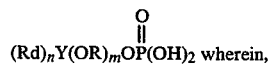

$(Rd)_nY(OR)_mOP(OH)_2$ wherein,

Rd is selected from 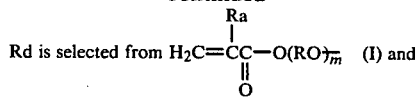

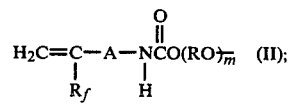

n is 1-3, and those bond sites on Y not occupied by Rd are occupied by —H or —ReOH wherein Re is a straight chain or branched alkyl having 1-30 carbon atoms; Ra is selected from —H and —CH₃;

—Y— is a hydrocarbon moiety having four bond sites selected from straight chain, cyclic and branched aliphatic, aromatic and alicyclic moieties of 1-30 carbon atoms;

R is an alkylene moiety having 2 to 5 carbon atoms;

R_f is selected from hydrogen and methyl;

A is selected from

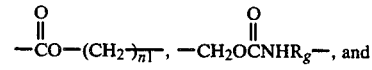

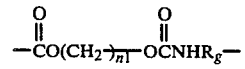

in which n1 is from 1 to 6 and

R_g is a divalent radical selected from alkylene groups (2-10 carbon atoms), 5 or 6 membered carbocyclic aliphatic radicals having 5 to 10 carbon atoms and arylene radicals having 6 to 10 carbon atoms; and m=1-10.

2. A recording medium of claim 1 in which the protective layer is transparent.

3. A recording medium of claim 1 in which the polymer is cured by radiation.

4. A recording medium of claim 3 in which the ethylenically unsaturated constituents comprise acrylic or methacrylic constituents.

5. A recording medium of claim 1 in which the phosphorate compound is included in an amount sufficient that phosphorous atoms account for between about 0.05 to 0.5 weight-percent of the polymer.

6. A recording medium of claim 1 in which the phosphorate compound comprises

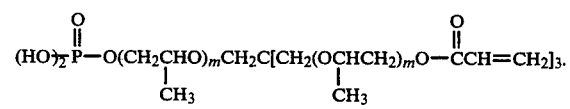

* * * * *

UNITED STATES PATENT AND TRADEMARK OFFICE
CERTIFICATE OF CORRECTION

PATENT NO.  : 4,652,498

DATED       : March 24, 1987

INVENTOR(S) : Stephen F. Wolf and Ramon F. Hegel

It is certified that error appears in the above-identified patent and that said Letters Patent is hereby corrected as shown below:

In Column 3, line 41, "amplary" should be --emplary--

In Column 3, line 65, "Phosphonate" should be --Phosphorate--

In Column 5, line 35, "expoxide" should be --epoxide--

In Column 5, line 52, "desirable" should be --desirably--

In Column 8, line 20, "haing" should be --having--

Signed and Sealed this

Fifth Day of January, 1988

Attest:

DONALD J. QUIGG

Attesting Officer

Commissioner of Patents and Trademarks